UNITED STATES PATENT OFFICE.

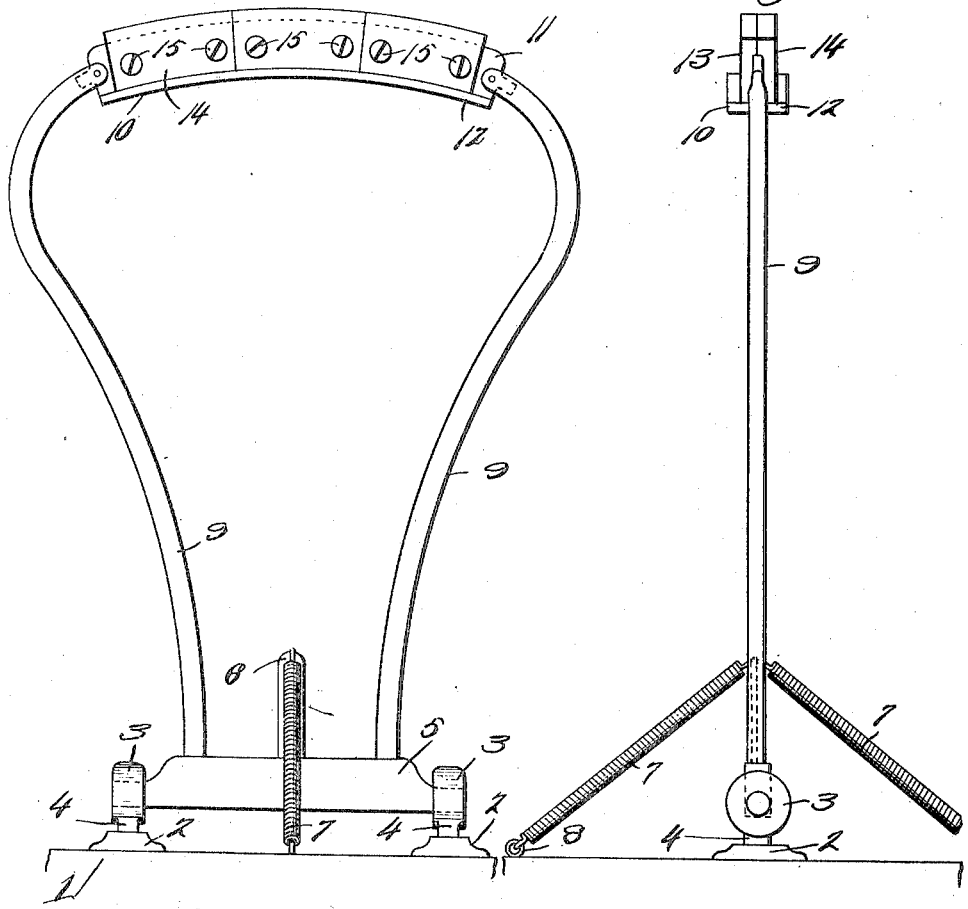

HERMAN L. STANLEY, OF DERBY, CONNECTICUT.

TROLLEY.

1,283,946.

Specification of Letters Patent.    Patented Nov. 5, 1918.

Application filed June 29, 1917. Serial No. 177,842.

*To all whom it may concern:*

Be it known that I, HERMAN LLOYD STANLEY, a citizen of the United States, residing at Derby, in the county of New Haven and State of Connecticut, have invented certain new and useful Improvements in Trolleys, of which the following is a specification.

This invention relates to trolley poles and the object of the invention is to provide a trolley pole having a contact bar adapted for sliding engagement with the trolley wire, said bar extending transversely to the trolley wire and being of sufficient length to prevent the trolley from springing up out of engagement therewith.

Another object of the invention is to provide the contact bar of the trolley pole with a removable anti-friction surface, said surface consisting of a plurality of friction reducing plates secured to the bar and being readily removable therefrom for the purpose of renewal.

The above and other objects and advantages of this invention will be in part described and in part understood from the following description of the present preferred embodiment, the same being illustrated in the accompanying drawings, in which, Figure 1 is a front view of my invention, Fig. 2 is an edge view, and Fig. 3 is a cross sectional view of the contact bar showing the removable surface plate attached thereon.

In the drawings 1 indicates a section of a car roof and 2 a pair of spaced sockets secured thereon. 3 indicates a pair of brackets having depending posts 4 adapted to be received in said sockets. Positioned between said brackets and having its opposite ends reduced and journaled therein is a shaft 5. An extension 6 is formed integral with this shaft and is positioned intermediate the opposite ends thereof. A pair of springs 7 are provided and are disposed on opposite sides of the extension 6, each spring having one terminal connected to the upper end of the extension 6 and the opposite terminal connected by means of an eye screw 8 or the like to the roof section 1.

The trolley pole or frame proper consists of two supporting posts 9 each having its lower end formed integral with or connected to the shaft 5 adjacent one end thereof. These posts are curved as shown and have their upper ends extending inwardly and secured to the opposite ends of a long arcuate, or curved bar 10. In cross section, the shape of this curved bar 10 is substantially the same as that of an inverted T, consisting as it does of a vertical rib 11 and a horizontal flange 12 formed integral with the lower edge of the rib and extending outwardly to either side thereof. Supported on this flange and engaging opposite sides of the rib are a plurality of plates 13 and 14, the plates 13 engaging one side of the rib and the plates 14 the opposite side thereof. Each of these plates 13 is provided with a plurality of openings registering with similar openings in the rib 11 and in the oppositely positioned plates 14 and through these alined openings are passed suitable fastening members. Owing to the frequency with which they have to be renewed these plates 13 and 14 are held in position on the rib 11 by means of sectional bolts, each of which is formed in two parts consisting of a male part 16 and a female part 17. This particular form of bolt is used in order to do away with the necessity of providing threaded openings in the rib as the threads of the openings would soon become worn owing to the frequent renewal of the plates 13 and 14.

As shown, these opposing plates 13 and 14 have their upper edges bent inwardly into abutting engagement above the upper edge of the rib, and thus provide a wearing surface adapted for engagement with the trolley wire. The bar 10 is preferably formed of copper and the plates 13 and 14 form an anti-friction surface for the same as these plates are composed of platinum or some other material which will reduce the friction between the trolley pole and conductor and will not be seriously affected by the spark generated therebetween.

As shown in Fig. 1, the springs 7 normally tend to hold the trolley pole in a vertical position but in practice the pole is adapted to operate at an angle of about twenty degrees and thus places one of the springs under tension according to the direction of travel. The spring thus placed under tension will exert sufficient force to keep the contact bar in engagement with the over head conductor. The contact bar of the pole is positioned to extend transversely of the conductor and is made long enough to prevent any possibility of the pole jumping free of the conductor or tearing the stay wire loose therefrom. The sway of the car to which the pole is attached will give the contact bar sufficient lateral movement to prevent the trolley conductor from wearing a deep groove therein.

From the foregoing it is thought that the construction and operation of my invention is clear and I wish to state herein that the invention is susceptible of various changes in the construction, proportion and arrangement of the several parts thereof and I reserve the right to make all such changes as may come within the scope of the appended claim without departing from the spirit of the invention.

I claim:—

A trolley pole including a horizontal contact bar provided with a vertically extending rib, a plurality of contact plates engaging opposite sides of said rib and provided with inwardly directed flanges meeting in abutting relation above the upper edge of the rib to provide a wearing surface for the rib, and a plurality of fastening members passing horizontally through said rib and plates to removably secure the latter in position.

In testimony whereof I affix my signature in presence of two witnesses.

HERMAN L. STANLEY.

Witnesses:
 HORACE TRIPP, Jr.,
 ALFRED J. KLOUCKS.

Copies of this patent may be obtained for five cents each, by addressing the "Commissioner of Patents, Washington, D. C."